United States Patent [19]

Schmidhuber et al.

[11] 4,190,284
[45] Feb. 26, 1980

[54] VEHICLE SEATS

[75] Inventors: Karl Schmidhuber, NT-Rossdorf; Hans D. Lehmann, Dettingen-Guckenrain, both of Fed. Rep. of Germany

[73] Assignee: Recaro GmbH & Co., Kirchheim, Fed. Rep. of Germany

[21] Appl. No.: 907,506

[22] Filed: May 19, 1978

[30] Foreign Application Priority Data

May 28, 1977 [DE] Fed. Rep. of Germany ... 7717085[U]

[51] Int. Cl.² .............................................. A47C 7/62
[52] U.S. Cl. ..................................... 297/194; 297/113
[58] Field of Search ............... 297/194, 411, 113, 115, 297/116, 117, 416, 417, 188

[56] References Cited

U.S. PATENT DOCUMENTS

| | | | |
|---|---|---|---|
| 2,449,965 | 9/1948 | Bell | 297/194 X |
| 3,472,239 | 10/1969 | Gielow et al. | 297/194 X |
| 3,472,241 | 10/1969 | Gielow et al. | 297/194 X |
| 3,637,184 | 1/1972 | O'Brien | 297/194 X |
| 3,926,473 | 12/1975 | Hogan | 297/411 X |
| 4,040,659 | 8/1977 | Arnold | 297/194 |
| 4,052,103 | 10/1977 | Steinthal | 297/113 X |

FOREIGN PATENT DOCUMENTS 575186  4/1958  Italy ........................................ 297/115

*Primary Examiner*—Roy D. Frazier
*Assistant Examiner*—Peter A. Aschenbrenner
*Attorney, Agent, or Firm*—Wigman & Cohen

[57] ABSTRACT

A vehicle seat, especially for airplanes and omnibusses, having an arm rest formed as a box beam support with improved means for mounting a passenger control unit is disclosed. The control device, shiftable between use and non-use positions, is rotatably mounted to the front end of the arm rest between a pair of plastic guide strips affixed to the confronting side walls of the arm rest by means of resiliently biased pins on the control device rotatably engaging in aligned bores in the guide strips and side walls. The guide strips are formed with a straight portion and a curved portion having chamfered edges. An open-ended cross groove is provided on the curved portion for engaging a resiliently biased detent pin on the control device in its use position.

5 Claims, 4 Drawing Figures

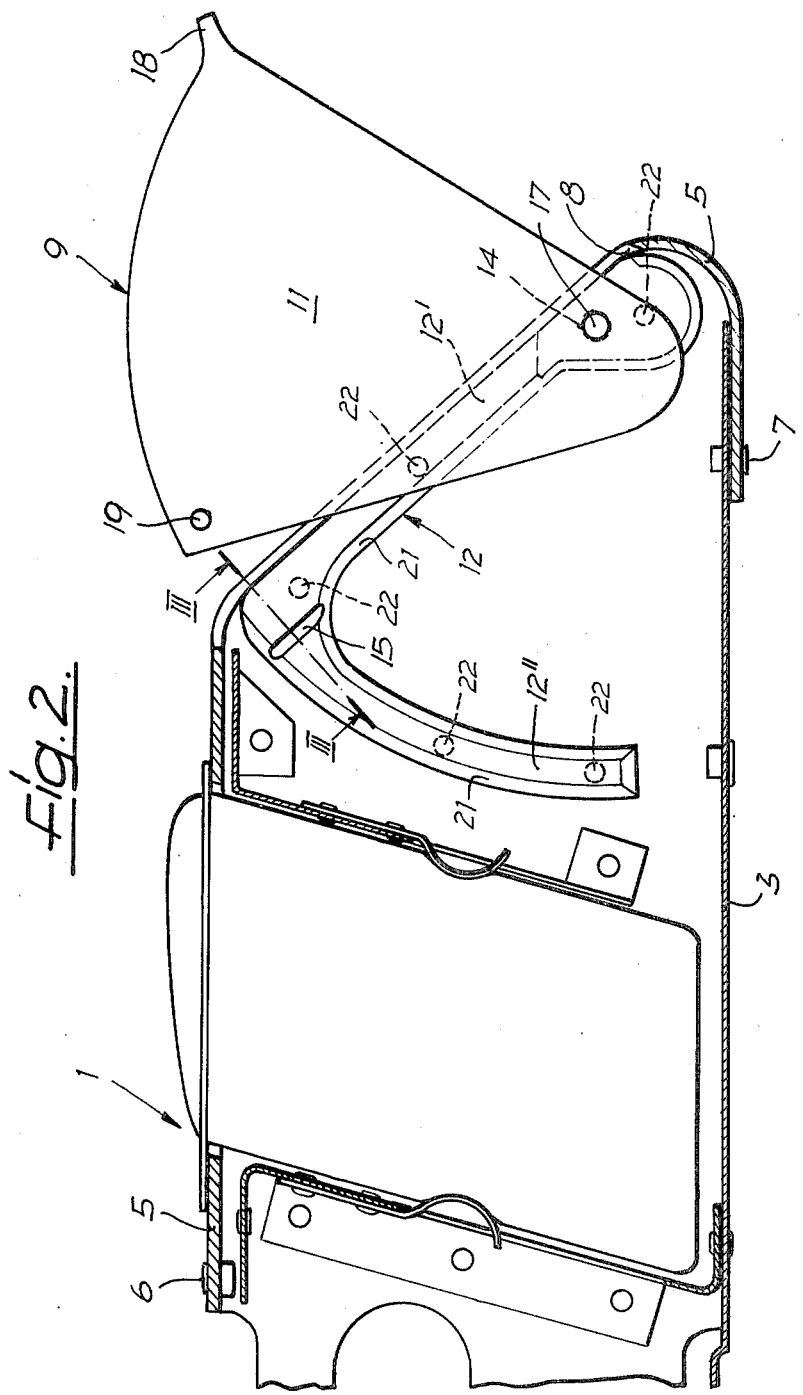

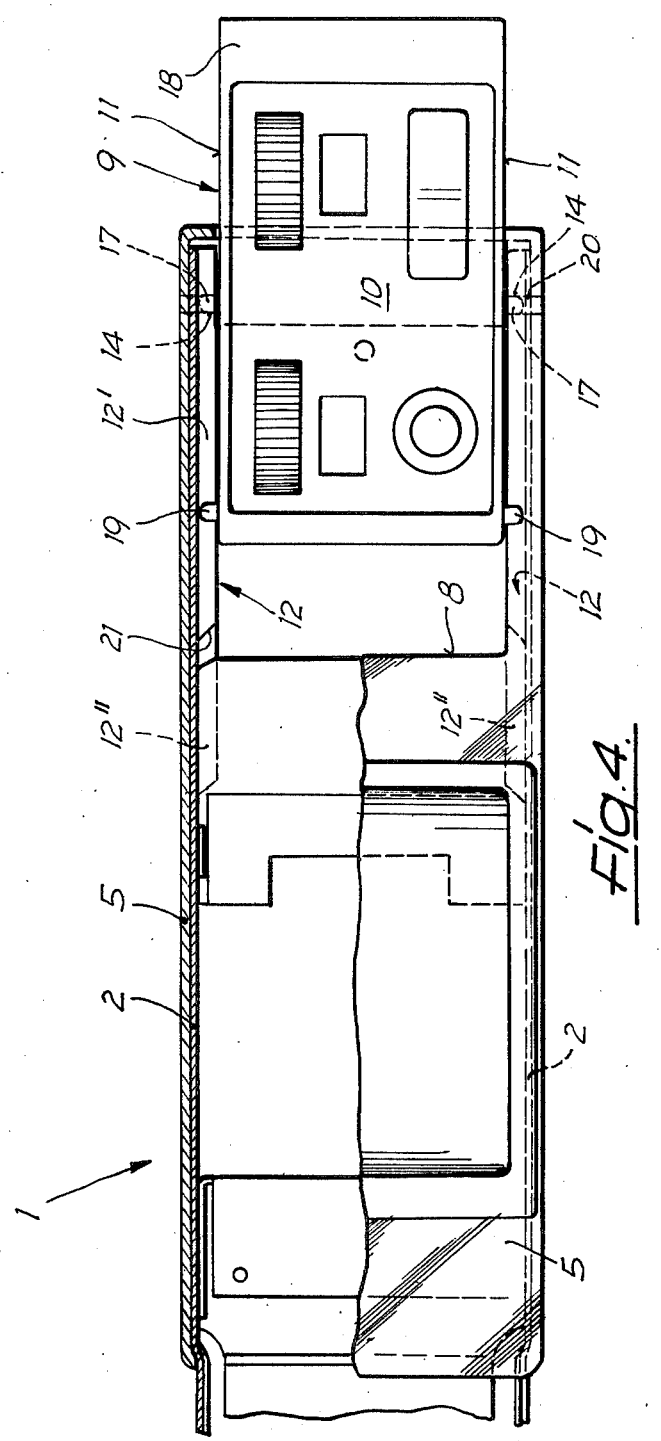

VEHICLE SEATS

BACKGROUND OF THE INVENTION

The present invention relates to a vehicle seat, especially for airplanes and omnibusses, having at least one arm rest, the front terminal of which is formed as a box beam support, and in which there is arranged a control device capable of rotation about an axis transverse to the longitudinal axis of the arm rest. This rotation starts from a non-use position, where the control device lies within the arm rest closing an opening in a closure which covers the top and front of the front terminal section of the arm rest. The control device can be rotated through this opening into a use position, in which use position its front plate or control panel is exposed, and back to the non-use position.

In known vehicle seats of this type, the closure, which is attached to the arm rest with screws, must be removed for maintenance work or for replacement of the control device, commonly called a passenger control unit (PCU). This is because the control device cannot be rotated beyond its use position out of the arm rest or removed for replacement, if necessary, until the closure is removed. A further disadvantage is that the clearance width of the front terminal section of the arm rest must be adapted to the width of the control device or vice-versa, so that the control device cannot slip in the direction of its axis of rotation into the interior of the arm rest.

SUMMARY AND OBJECTS OF THE INVENTION

A primary objective of the invention is to provide a vehicle seat with an arm rest formed in such manner that neither access to the control device for maintenance nor the insertion or removal thereof poses any difficulties. This objective is accomplished according to the invention in a vehicle seat of the above-mentioned type by means of the following features. The guide control device is disposed between two plastic guides, which guides are arranged on the inside of the arm rest against the confronting sides thereof and are rigidly attached thereto. Two pins of the control device, which form the axis of rotation thereof and which can be axially compressed against the force of a spring, rotatably engage in mounting bores of the two guides, each of which mounting bores aligns with an associated bore in the two side walls of the arm rest. The guides have detention points for at least one elastic detent pin provided on the control device, and the opening defined by the frame-like portion of the arm rest enclosure is of a size that permits the control device to pass completely therethrough.

Because it is unnecessary that the frame-like portion of the arm rest closure surrounding the control device opening prevent the rotation of the control device beyond the use position, in contrast to the known embodiments, but rather permits the control device to completely pass through, the control device can be rotated outward completely out of the arm rest for maintenance or removal without having to initially unscrew the closure.

The detention points of the guides, together with the detent pin or pins of the control device, permit the control device to be held in the use position and, if desired, in the non-use position as well. The detent pin slides on the guide during the rotational movement of the control device so that the detent pin cannot engage into the side wall of the arm rest which is usually formed of aluminum. This not only offers the simple possibility of forming the detent pins in such a manner that it is sufficient, for unlocking purpose, to exert a rotational force on the control device that exceeds a minimum value, but with the aid of the guides, the control device can also be positioned in the arm rest, i.e., the guides determine the distance of the control device from the two side walls of the arm rest. The guides, therefore, make it unnecessary to adapt the clearance width of the arm rest to the width of the control device or vice-versa. This is especially advantageous when, for example, at a subsequent time, it is desired to incorporate a control device into an existing arm rest. Finally, because the guides are usually much thicker than the side walls of the arm rest, they make it possible to provide relatively long mounting bores for the mounting pins of the control device and to eliminate the necessity for the mounting pins to project through the outside of the side walls of the arm rest. Thus, substantially greater tolerances are allowable for the mounting elements without disadvantageously affecting the reliability of the mounting.

The control device is not, however, only made more easily accessible for servicing purposes. The insertion and removal of the control device is also facilitated by the embodiment according to the invention and can be accomplished without removing the closure. For removal, it is only necessary to insert a rod or the like into the mounting bores from the outside through the bores in the side walls and compress the pins inwardly so they no longer engage in the mounting bores. The control device can then be removed from the arm rest. For insertion, the pins need only be pushed into the control device far enough that, together with the portion of the control device mounting them, the pins can be placed between the guides. Thereafter, the pins automatically enter the mounting bores as soon as they are aligned therewith.

In a preferred embodiment, the guides are not formed as plates but as strips having a straight section, in order to minimize the cost of the guides and maintain the side walls of the control device as unobstruced as possible. The straight section of the strips runs along the usually inclined edge of its supporting side wall of the arm rest, which is covered by the closure. On the upper end of the guides, there is joined a curved section which extends downwardly along an arcuate path centered about the bore containing the pins of the control device. Whether or not the detent pin or pins remain against the upper side of the strips forming the sliding track during insertion or removal, poses no difficulty because the curved section is provided with a chamfered surface which is inclined toward the side wall of the arm rest on both of its long sides as well as its free narrow side or end and the straight section is similarly provided with a chamfered surface along its long side facing the inside of the arm rest. By means of these chamfered surfaces, the detent pin can be urged back onto the upper side of the strip, should it become separated or disloged therefrom.

Preferably, the detention point that locks the control device in the use position is formed as a cross groove in the end region of the curved section adjacent the straight section. The cross-sectional shape of this cross groove can be selected in such a manner that it prevents a further outward rotation in the control device out of the arm rest, because the removal of the control device can take place in a different rotational position. In order to be able to remove the control device without difficulty, even in the rotational position determined by the cross groove, the cross groove is open-ended and extends to both the side chamfered surfaces of the curved section. The detent pin can then be guided out of the cross groove in the longitudinal direction of the groove as the control device is removed.

The free end of the curved section of the strip may be provided as a detention point for releasably locking the control device in the non-use position.

In order to attach the guides in the simplest possible manner to the side walls of the arm rest, in one preferred embodiment, securing pins can be formed on the guides on the side adjacent the side wall. Each of these securing pins engages a bore in the side wall and has a broadened head on its free end.

BRIEF DESCRIPTION OF THE DRAWINGS

The invention is described below in detail with the aid of the embodiment shown in the drawings, wherein:

FIG. 2 is a fragmentary side view of the arm rest of the invention, party in longitudinal section and having a fully outwardly rotated control device;

FIG. 4 is a fragmentary top view of the arm rest of the invention when the control device is fully outwardly rotated.

DETAILED DESCRIPTION OF A PREFERRED EMBODIMENT

Figure 1:
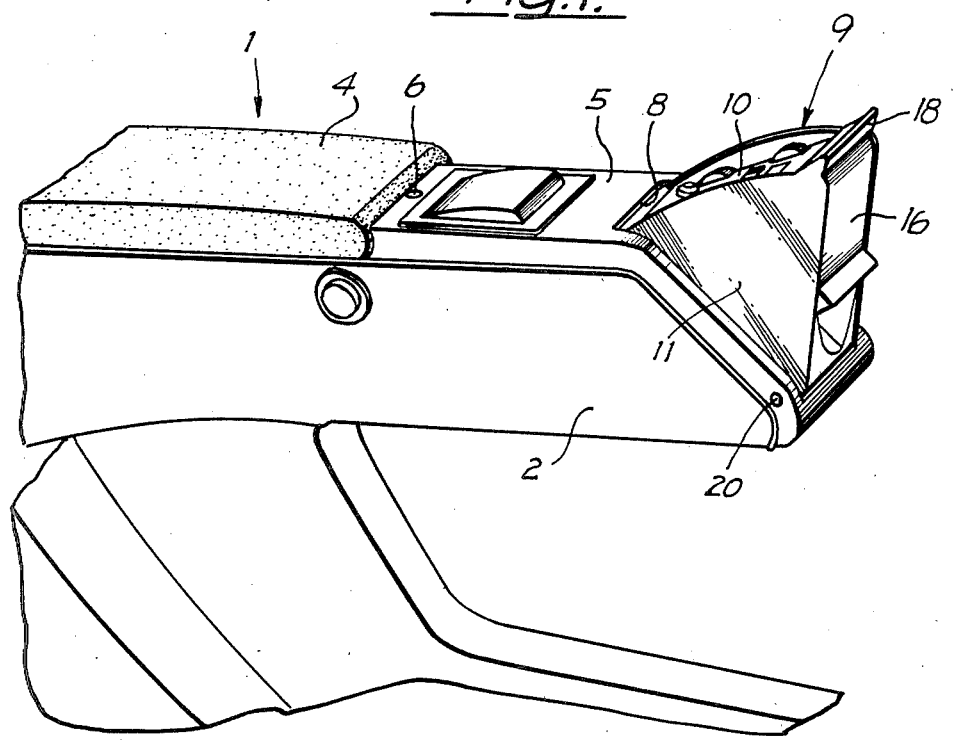
FIG. 1 is a fragmentary perspective view of a portion of the seat and the arm rest of the exemplary embodiment of the invention with the control device shown in the use position.
Figure 3:
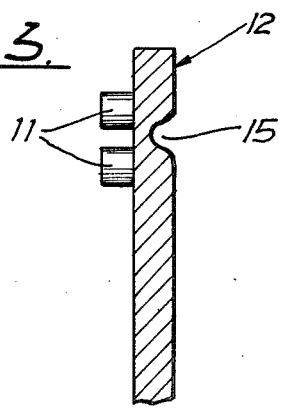
FIG. 3 is a section taken along line II—II of FIG. 2.

A flight passenger seat, of which only part of the back rest and seat portion is shown in FIG. 1, includes an arm rest 1, the rear end of which is pivoted about a support for the back rest, and extends forwardly from one side of the back rest in the use position. The arm rest 1 is a box beam support formed of aluminum sheet, which tapers toward its free end as shown in FIGS. 1 and 2. The two side walls 2 of the arm rest lie parallel to each other, as shown by FIG. 4 and vertically with respect to the floor plate 3. Upholstery 4 is placed on the upper side of the box beam support, but terminates a distance from the free end of the arm rest, as shown in FIG. 1. Adjacent the upholstery 4, there is attached a closure or closure plate 5, usually made of stainless steel, which overlaps the upper edges of both side walls. The closure 5 also wraps around the rounded front end of the box beam support. A screw 6, which penetrates the end of the enclosure 5 next to the upholstery 4, and a screw 7, which penetrates the other end from beneath and engages in a threaded rivet attached to the inside of the floor plate 3, connect the closure 5 with the box beam support. In the section lying parallel to the floor plate 3, the closure 5 has a rectangular opening by means of which an ash tray is located in the arm rest.

In the inclined section approaching the floor plate 3, there is an additional rectangular opening 8 for a control device 9, commonly called a passenger control unit (PCU). The front plate 10 of the control device 9 supports switches and setting elements, by means of which, for example, various programs may be selected and adjusted for connection to a head set and a stewardess may be summoned.

The control device 9 has parallel side walls 11, as shown in FIG. 4, which are formed somewhat in the shape of a triangle. The spacing between the walls 11 is smaller than the distance between the side walls 2 of the arm rest 1. Two guide strips 12, which are mirror images of each other and are made of plastic having good sliding characteristics, such as, for example, hard PVC, polyamide or Delrin, are arranged on the inside of a respective side wall 2 of the arm rest and are rigidly connected with the side walls by means of form-fitting pins 22, which pass through bores in the side walls 2 and have rivet-like, broadened heads. As FIG. 2 shows, the guide strips have a straight section 12', which extends along the inclined section of the upper edge of the side wall 2 and flush therewith. The lower end of the section 12' is widened in the form of an eye. On the upper end of the straight section 12', located in the area of transition between the inclined section of the closure 5 to the section thereof that extends parallel to the floor plate 3, there is joined a circular arc-shaped curved section 12", which extends toward the floor plate 3 and terminates at a distance therefrom. The center of the radius of the curve of section 12" lies at the center of a mounting bore 14, which is provided in the eye formed by the free end of the straight section 12'. The mounting bore 14 of each guide strip aligns with a bore 20, which penetrates the side wall 2 and the overlapping angled edge of the closure 5. Both mounting bores 14 lie along an axis parallel to the floor plate 3 and 4 and at right angles to the longitudinal axis of the arm rest 1.

As FIG. 2 shows, the straight section 12' of the guide strip 12 is provided with a chamfered surface 21 along its lower long side facing the interior of the arm rest, as well as along the edge of the free end forming the eye. The curved section 12" is also provided with a chamfered surface 21 along both of its long arcuate sides, as well as along the free end of its narrow side. These chamfered surfaces 21 form a ramp or angled plane between the inside of the side wall 2 and the upper side of the guide strip 12 which is directed inwardly, i.e., away from the wall 2. In the area of the end of the curved section 12" adjacent the straight section 12', there is provided a detention point 15 in the form of a groove extending across the curved section 12" and terminating in an open-ended manner adjacent the chamfered surfaces.

In both the use position shown in FIG. 1 and in the non-use position, where it lies completely within the arm rest 1, and where its front wall 16 closes the opening 8 of the closure 5, the control device 9 lies between the two guide strips 12. The thickness of the strips 12 is, therefore, chosen in such a manner that only a limited distance exists between the strips and the side walls 11 of the control device 9, that is, the distance which is necessary for the movement of the control device relative to the arm rest. The control device 9 is rotatably mounted in the guide strips 12 by means of two mounting pins 17, which engage in the mounting bores 14. The two mounting pins are arranged in the area of the corner of the side walls 11 remote from the front plate 10. The mounting pins 17 can be compressed in the axial direction into the mounting bores 14 against a spring force by means of a rod or the like, which rod may be introduced through the bores 20 of the side wall 2 and the closure 5, until they are disengaged from the mounting bores 20. The control device 9 can then be removed from the arm rest 1. Correspondingly, when replacing the control device into the arm rest, the mounting pins 17 are compressed inwardly far enough so that, as the control device is inserted, the pins 17 contact the upper sides of the guide strip 12. As a result of the spring loading, the pins 17 automatically enter the mounting bores 14 as soon as they are aligned therewith.

The dimensions of the opening 8 are selected in such a manner that the control device 9 can be passed completely therethrough, but in a manner such that there remains a small space between the edge of the opening and the control device.

In the non-use position, the control device 9 is prevented from further rotation into the interior of the arm rest 1 by a gripping strip or handle 18 on one end of the front plate 10 of the control device 9. By means of the gripping strip, the control device may be readily and easily rotated into the use position. Two spring-loaded pins 19, arranged parallel to the mounting pins 17, project out of a respective side wall 11 of the control device at the same distance from the mounting pins 17 as the radial distance of the mid-portion of the curved section 12" of the guide strip 12 from the mounting bore 14. In the non-use position, the pins 19 bear against the free end of the curved guide strip section 12". Because, during rotational movement of the control device 9 into the use position, the two detent pins 19 first slide over the chamfered surface of the free end of the guide strip section 12" and must, therefore, be compressed somewhat further into the control device against the spring force, a minimum force must be exerted on the gripping strip 18 to overcome the detention effect of the detent pins 19. During further rotational movement, the detent pins 19 slide on the upper side of the curved sections 12" with a small amount of friction. Once the use position is attained, the detent pins 19 engage in the two detention points 15. By means of the equal slope of the sides of the groove-like detention points 15, a rotational movement beyond the use position is possible.

As a result of the chamfered surfaces on the guide strips 12, during removal and insertion of the control device 9, there is no difficulty with whether or not the detent pins 19 remain in contact with the upper side of the guide strips. Should the pins 19 become disengaged from the guide strips 12, they can be returned into contact with the upper side or slide track of the strips 12 by reason of the chamfered surfaces. In addition, a removal of the control device 9 from the use position is possible, by guiding the detent pins 19 out of the open-ended grooves of the detention points 15.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. In a vehicle seat, especially for airplanes and omnibusses, having at least one arm rest formed generally as a box beam support, said arm rest having opposing side walls and a front terminal section, a closure member covering at least the front terminal section of the arm rest, said closure member having an opening therethrough, a control device arranged in said front terminal section, means for rotatably mounting said control device about an axis transverse to the longitudinal axis of the arm rest from a non-use position wherein the control device lies inside the arm rest and closes the opening of said closure member, through said opening and into a use position and back, the improvement comprising a guide affixed to the inside of each side wall of the arm rest adjacent the front terminal section thereof, said means for rotatably mounting the control device including aligned mounting bores in each guide and side wall and resiliently biased pins mounted on said control device for rotatably engaging in said mounting bores, further comprising at least one resiliently biased detent pin provided on said control device, at least one of said guides having detention point means for engaging said detent pin and arresting said control device into its use position, said opening in the closure member being of a size to permit the control device to pass completely therethrough.

2. The improvement according to claim 1, wherein said guides are formed as plastic guide strips, said guide strips each comprising a straight portion extending along an edge of its respective side wall adjacent said opening and a curved portion extending downwardly from an end of said straight portion, the center of the radius of said curved portion lying substantially along the axis of rotation of the control device, said curved portion having chamfered edges inclined toward its respective side wall, said straight portion having a chamfered edge on the lower side thereof and inclined toward its respective side wall.

3. The improvement according to claim 2 wherein said detention point means comprises a cross groove in said curved portion of said at least one guide adjacent the straight portion thereof, said groove being open-ended and extending to the chamfered edges of the curved portion.

4. The improvement according to claim 1 wherein said guides are each formed with fastening pins on the side thereof confronting the respective side wall, each side wall having bores for receiving said fastening pins, each said fastening pins having a broadened head on its free end.

5. The improvement according to claim 1 wherein said guides are formed of a plastic material having low-friction characteristics.

* * * * *